Dec. 23, 1958  F. K. BENNETT  2,865,202
DEVICE FOR MEASURING AND DETECTING THERMAL ENERGY
Filed April 23, 1954
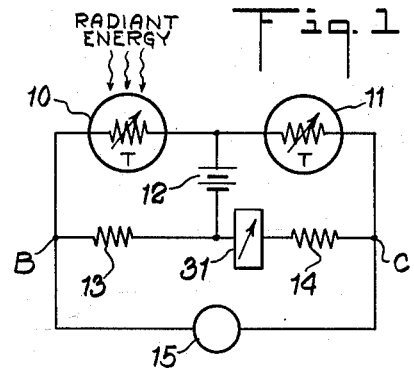
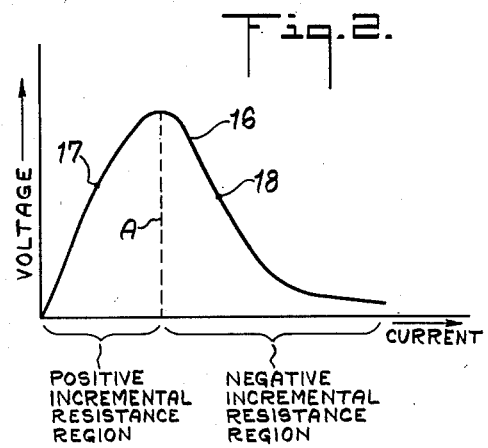
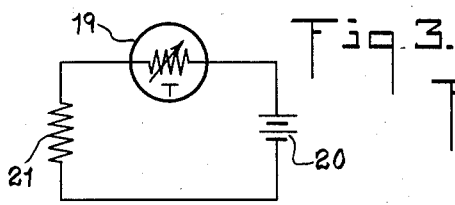
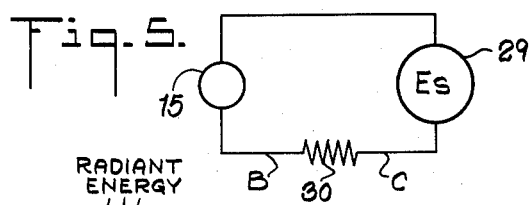
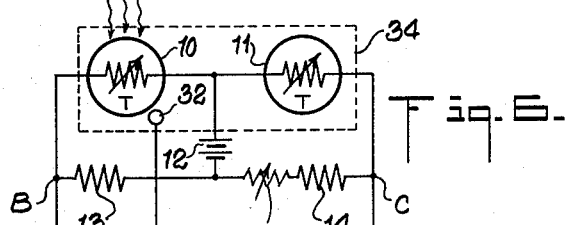
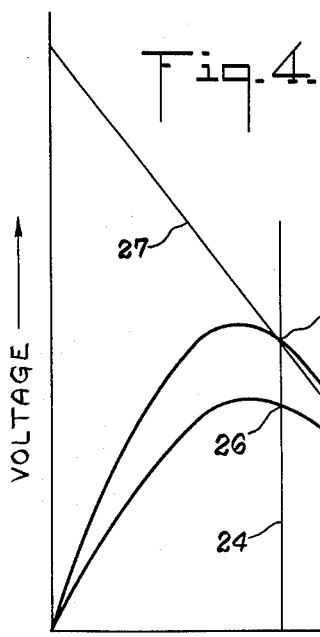
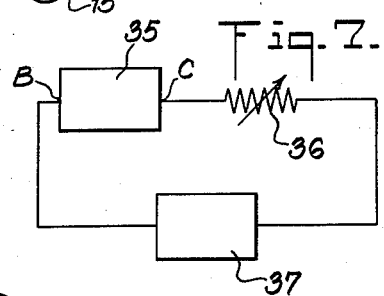
INVENTOR.
Frank K. Bennett
BY
Cyrus D. Samuelson
attorney

United States Patent Office 2,865,202
Patented Dec. 23, 1958

2,865,202

DEVICE FOR MEASURING AND DETECTING THERMAL ENERGY

Frank K. Bennett, Iselin, N. J., assignor to Gulton Industries, Inc., a corporation of New Jersey Application April 23, 1954, Serial No. 425,147

5 Claims. (Cl. 73—355)

My invention relates to an improved device for the detection and measurement of thermal energy.

An important object of my invention is to provide a thermal energy detector of high sensitivity.

A further object of my invention is to provide a device for the detection and measurement of low levels of intensity of the thermal energy.

A still further object of my invention is to provide a device for determining the equivalent resistance of the thermal energy detector.

Other objects and advantages of my invention will be apparent during the course of the following description.

In the accompanying drawings, forming a part of this application, and in which like numerals are employed to designate like parts throughout the same, Figure 1 illustrates the schematic diagram of a circuit used for the measurement and detection of radiant energy, Figure 2 illustrates a typical thermistor steady-state voltage-current characteristic curve, Figure 3 is a simplified schematic diagram of a thermistor radiant energy detection circuit, Figure 4 illustrates the plot of voltage against current for a thermistor in the absence and in the presence of radiant energy, Figure 5 is a simplified diagram of the equivalent circuit used for the measurement and detection of radiant energy, Figure 6 illustrates the schematic diagram of a circuit with temperature compensation and temperature insulation means, which circuit is used for measuring and detecting radiant energy, and Figure 7 is a simplified diagram illustrating a method of measuring the equivalent resistance of a thermistor circuit.

In the drawings, wherein for the purpose of illustration, is shown a preferred embodiment of my invention, 10 designates the thermistor which is to be subjected to the radiant energy to be measured and detected and 11 designates the thermistor which is used as the opposite arm of the measurement circuit. 13 and 14 designate the two resistive arms of the measurement circuit, 12 represents the internal voltage source for operation of the circuit, 15 designates the measurement circuit detector and 31 designates circuit balancing means.

16 designates a typical steady-state voltage-current characteristic curve of a thermistor, 17 designates a typical point in the positive incremental resistance region and 18 designates a typical point in the negative incremental resistance region.

19 designates a typical thermistor, 21 designates a resistance and 20 designates a source of voltage.

22 designates a typical steady-state voltage-current characteristic curve of a thermistor in the absence of radiant energy and 23 designates the steady-state voltage-current characteristic curve of the same thermistor in the presence of a given amount of radiant energy.

24 represents the plot of constant current in the negative incremental resistance region and 25 and 26 designate the points at which it intersects curves 22 and 23, respectively. 27 represents a resistance-voltage load line which intersects curve 22 at point 25 and curve 23 at point 28.

29 designates the voltage which is generated in a typical thermistor radiant energy measuring and detecting circuit by the radiant energy and 30 designates the equivalent resistance of the bridge portion of Figure 1.

31 designates the circuit balancing means, 32 is the temperature compensating detector, 33 designates the measurement circuit detector thermal compensator and 34 designates the thermal insulation chamber.

35 represents the thermistor bridge circuit, 36 represents a standard resistance and 37 represents resistance measuring means.

A thermistor is a resistor with a large negative temperature coefficient of resistance and which is thermally sensitive. The resistance of most present day metallic oxide thermistors is reduced by approximately 4% per degree centigrade increase in temperature. Since the thermistor is a resistor, it follows the natural laws governing resistors, such as: the increase in current through a resistor increases the power dissipated in it and consequently raises the temperature of the resistor. Therefore, the application of high voltage to a thermistor makes the thermistor very hot and places its temperature considerably above that of the surrounding medium. In the usual practice for the detection and measurement of thermal energy, the voltage applied to the thermistor is kept low, so that the heating effect of the electrical energy dissipated in the thermistor does not raise the temperature of the thermistor much above the ambient temperature of the surrounding medium. In some applications, the thermistor has a very high voltage applied to it so that its temperature is raised electrically to a value substantially higher than the ambient temperature of the surrounding medium. Devices such as vacuum manometers, flow meters, anemometers, gas analysis cells, effusiometers, liquid level gauges and the like are examples of measuring instruments which use the technique of applying a high voltage to the thermistor. When high voltage is applied to the thermistor, the final temperature and its consequent resistance is dependent upon the thermal conductivity of the surrounding medium.

In the usual application of the circuit of Figure 1, in which the voltage supplied by 12 is of reasonably low value, the measurement circuit detector 15 consists of a D.-C. amplifier or other suitable amplifying means and a meter. This is necessary because the current from the measurement circuit is too small to be detected by meters of even the highest practical sensitivities.

Figure 2 is a plot of the steady-state voltage-current characteristic curve of a typical thermistor. Voltage is plotted in the vertical direction and current is plotted in the horizontal direction. The dotted line A divides the curve and the area under it into two regions, the one between the voltage axis and A being the positive incremental resistance region and the one to the right of A being the negative incremental resistance region. In the positive incremental resistance region, increase in voltage produces increase in current, while in the negative incremental resistance region, increase in voltage produces a decrease in current. These two regions are called incremental resistance regions because any small portion of the curve may be, for analytical purposes, considered a straight line, and the thermistor considered a pure resistor over said straight line portion of the curve. The portion of the curve between A and the voltage axis is the positive incremental resistance region because the slope of 16 in the region is positive. Similarly the region to the right of A is the negative incremental resistance region because the slope of 16 in that region is negative. Point 17 is a typical point in the positive incremental resistance region and point 18 is a typical point in the negative incremental resistance region.

A preferred embodiment of my invention employs the circuit depicted in Figure 1. In it the voltage supplied by 12 is made fairly high so that 10 and 11 are heated above the ambient temperature of the surrounding medium and 13 and 14 are selected of high enough value so that the stable operating point of the combination is in the negative incremental resistance region. Operation at point 18 cannot be achieved if the resistances of 13 and 14 are below a certain minimum value, which is determined by the characteristics of the circuit. I have discovered that, in order to operate in a stable manner in the negative incremental resistance region, that is to obtain and maintain a balanced condition of circuit equilibrium in the absence of radiant energy, the resistance of 15 must be slightly greater than its critical value. This critical value is determined by the individual characteristics of 10 and 11, the voltage supplied by 12 and the values of resistance of 13 and 14. 31 is merely a balancing means which is employed to obtain balance in the absence of radiant energy. In some applications it may be a part of 13 or 14 or both 13 and 14 may be made variable along a portion or all of their range or the balancing means may be placed in any convenient leg or branch of the circuit.

Figure 3 is a simplified schematic diagram which serves to explain the phenomenon which I choose to call temperature amplification and which may be realized from my invention. Line 27 represents the load line due to the voltage source 20 and the resistor 21. This line 27 is superimposed in Figure 4 on the steady-state voltage-current characteristic curves of the thermistor. Curve 22 is a representation of the steady-state voltage-current characteristic curve of the thermistor in the absence of radiant energy and curve 23 is a representation of the steady-state voltage-current curve of the same thermistor in the presence of a given amount of radiant energy. The curves 22 and 23 are of substantially the same shape and are two of a family of curves which are all of substantially the same shape and represent the characteristics of the thermistor in the presence of varying amounts of radiant energy. If constant current is applied to 19 as represented by line 24, then the operating point of the thermistor moves from 25 in the absence of radiant energy to 26 in the presence of radiant energy. Under these conditions, there is no change in the current flow through 19 and no change in its temperature due to change in current flow. However, if values of 20 and 21 are chosen so that the operating points of the circuit occur where the line 27 intersects curves 22 and 23, the operating point in the absence of radiant energy, 25, is moved to point 28 in the presence of radiant energy. This change amounts to a large change in current through 19 and a consequent large change in the temperature of thermistor 19.

High sensitivity is obtained if the resistance of the measurement circuit detector 15 is made slightly greater than and opposite in sign to the equivalent resistance of the measurement circuit itself. In Figure 5, 30 represents the negative resultant resistance of the measurement circuit of Figure 1 between the points B and C. Numeral 29 represents the voltage, $E_s$, generated in the circuit by the presence of radiant energy and 15 is the measurement circuit detector. The operation of the circuit in the negative incremental resistance region results in a resultant negative resistance between points B and C so that the resistance of 15 must be positive and slightly greater than that of 30 in order for the circuit to remain stable in operation. If the resistance of 15 is less in absolute value than the negative resultant resistance of 30, the resultant total resistance of the circuit of Figure 5 is negative and the operation is unstable. If the resistance of 15 is very slightly higher than that of 30, the resultant total resistance of the circuit of Figure 5 is very small and the current in the circuit and the sensitivity is high. If the resistance of 15 is exactly equal to that of 30, the current in the circuit of Figure 5 would be infinite since the resistance is zero. This condition is an unstable one and cannot be achieved physically but an equilibrium condition and consequent stability may be obtained if the resistance of 15 is only slightly greater than that of 30.

In order to obtain good stability in the presence of radiant energy, it is advisable to enclose both thermistors 10 and 11 in a single thermal insulation chamber 34 so that the temperature changes which are due to effects other than the phenomena being detected or measured will be applied to both thermistors 10 and 11, equally. Thermal sensitive element 32 is also mounted in thermal insulation chamber 34 and is therefore subjected to the same temperature changes as 10 and 11. Thermal sensitive element 32 varies the resistance of control 33 which is in series with the measurement circuit detector 15. The circuit of 32, 33 and 15 is arranged so that the resistance of the measurement circuit detector 15 and its associated circuit is maintained close to but just above the negative resultant resistance 30. The external thermal energy impinges on 10 and not on 11 which serves to help balance the bridge.

A preferred apparatus for determining the negative resultant or critical resistance of the measurement circuit is shown in Figure 7. 35 represents the measurement circuit of Figures 1 and 6 from points B and C excluding meter 15 and associated circuit elements, 36 represents a calibrated adjustable resistance and 37 represents an accurate means for measuring resistance. The circuit 35 is balanced, 36 is adjusted to obtain a positive resultant resistance of 35 and 36 as is measured by 37. The negative resultant resistance of 35 is determined by calculating the value of 35 from the known values of 36.

It is to be understood that the form of my invention, herewith shown and described is to be taken as a preferred example of the same, and that various changes in the number, shape and the arrangement of parts may be resorted to, without departing from the spirit of my invention, or the scope of the subjoined claims.

Having thus described my invention, I claim:

1. A radiation temperature sensing device comprising a bridge circuit, the first arm of said bridge circuit containing a first thermal sensitive element having a negative temperature coefficient of resistance exposed to the source of the temperature being measured, an arm of said bridge circuit adjacent said first arm containing a second thermal sensitive element shielded from the source of the temperature being measured, said second element also having a negative temperature coefficient of resistance, a resistor contained in each of the other two arms of said bridge circuit, a source of voltage applied across two opposite terminals of said bridge circuit sufficient to place the operating range of the combination in the negative incremental resistance region, and current detecting means whose resistance is positive and slightly greater than that of said bridge circuit connected across the other two opposite terminals of said bridge circuit.

2. A radiation temperature sensing device as described in claim 1 including balancing means connected in at least one arm of said bridge circuit.

3. A radiation temperature sensing device as described in claim 1 including a thermal compensating element in said current detecting circuit.

4. A radiation temperature sensing device as described in claim 1 including balancing means connected in at least one arm of said bridge circuit and a thermal compensating element in said current detecting circuit.

5. A radiation temperature sensing device as described in claim 1 wherein said first and second thermal sensitive elements are contained in a common enclosure carrying a window therein whereby only said first thermal sensitive element is exposed to the source of the temperature being measured.

References Cited in the file of this patent

UNITED STATES PATENTS

| | | |
|---|---|---|
| 1,639,411 | Mechau | Aug. 16, 1927 |
| 2,246,575 | Coleman | June 24, 1941 |
| 2,580,182 | Morgan et al. | Dec. 25, 1951 |
| 2,694,928 | Jacobson | Nov. 23, 1954 |

FOREIGN PATENTS

| | | |
|---|---|---|
| 680,636 | France | May 2, 1930 |
| 162,501 | Switzerland | June 30, 1933 |
| 661,923 | Germany | June 30, 1938 |
| 626,915 | Great Britain | July 22, 1949 |

OTHER REFERENCES

Article: Thermistors, part I, Static Characteristics, by O. J. Smith, publ., in Review of Scientific Instruments, vol. 21, No. 4, April 1950, pages 344–355.

Bulletin, Carboloy Thermistor Manual—1954, Carboloy Dept. of General Electric Co., Detroit 32, Michigan, pages 4–11.